(12) United States Patent
Suzuki et al.

(10) Patent No.: US 12,189,642 B2
(45) Date of Patent: Jan. 7, 2025

(54) INFORMATION PROCESSING APPARATUS AND PREDICTION METHOD

(71) Applicant: Fujitsu Limited, Kawasaki (JP)

(72) Inventors: Kanata Suzuki, Kawasaki (JP); Yoshinobu Iimura, Kawasaki (JP); Masatoshi Ogawa, Zama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 18/223,062

(22) Filed: Jul. 18, 2023

(65) Prior Publication Data

US 2024/0104107 A1 Mar. 28, 2024

(30) Foreign Application Priority Data

Sep. 21, 2022 (JP) ................. 2022-150211

(51) Int. Cl.
*G06F 16/2458* (2019.01)
(52) U.S. Cl.
CPC ...... *G06F 16/2477* (2019.01); *G06F 16/2458* (2019.01)
(58) Field of Classification Search
CPC .. G06F 16/2477; G06F 16/27; G06F 16/3323; G06F 16/2458
USPC ....................................... 707/787
See application file for complete search history.

(56) References Cited

U.S. PATENT DOCUMENTS

| | | | |
|---|---|---|---|
| 11,281,969 B1* | 3/2022 | Rangapuram | ........... G06F 17/13 |
| 2013/0060673 A1 | 3/2013 | Shah et al. | |
| 2015/0294246 A1* | 10/2015 | Guven Kaya | .... G06Q 10/06393 705/7.28 |
| 2019/0228329 A1* | 7/2019 | Utsumi | .............. G06Q 30/0202 |
| 2020/0226684 A1 | 7/2020 | Weng et al. | |
| 2022/0150211 A1* | 5/2022 | Vemulapelli | ............ H04L 69/08 |

FOREIGN PATENT DOCUMENTS

| | | |
|---|---|---|
| JP | 2016-127360 A | 7/2016 |
| JP | 2020-136937 A | 8/2020 |

OTHER PUBLICATIONS

Huang et al., "Mobile Traffic Offloading with Forecasting using Deep Reinforcement Learning", arXiv:1911.07452v1 [cs.NI], Nov. 18, 2019, pp. 1-9.
Wu et al., "Deep Reinforcement Learning With Spatio-Temporal Traffic Forecasting for Data-Driven Base Station Sleep Control", IEEE/ACM Transactions on Networking, vol. 29, No. 2, Apr. 2021, pp. 935-948.

(Continued)

*Primary Examiner* — Shahid A Alam
(74) *Attorney, Agent, or Firm* — XSENSUS LLP

(57) ABSTRACT

A non-transitory computer-readable recording medium stores a program for causing a computer to execute a process, the process includes identifying, among pieces of feature information of a plurality of pieces of time-series data, a plurality of pieces of feature information similar to feature information of processing target time-series data, obtaining a predicted value distribution of the processing target time-series data based on each of the plurality of pieces of feature information, obtaining a combined distribution from the predicted value distribution, and determining a range of predicted value for the processing target time-series data based on the combined distribution.

12 Claims, 14 Drawing Sheets

(56) References Cited

OTHER PUBLICATIONS

Kazemi et al., "Time2Vec: Learning a Vector Representation of Time", arXiv:1907.05321v1 [cs.LG], Jul. 11, 2019, 16 pages.
Christopher M. Bishop, "Mixture Density Networks", Neural Computing Research Group, Dept. of Computer Science and Applied Mathematics, Feb. 1994, pp. 1-25.
Jun Tani, "Self-Organization of Behavioral Primitives as Multiple Attractor Dynamics: A Robot Experiment", IEEE, 2002, pp. 489-494.

* cited by examiner

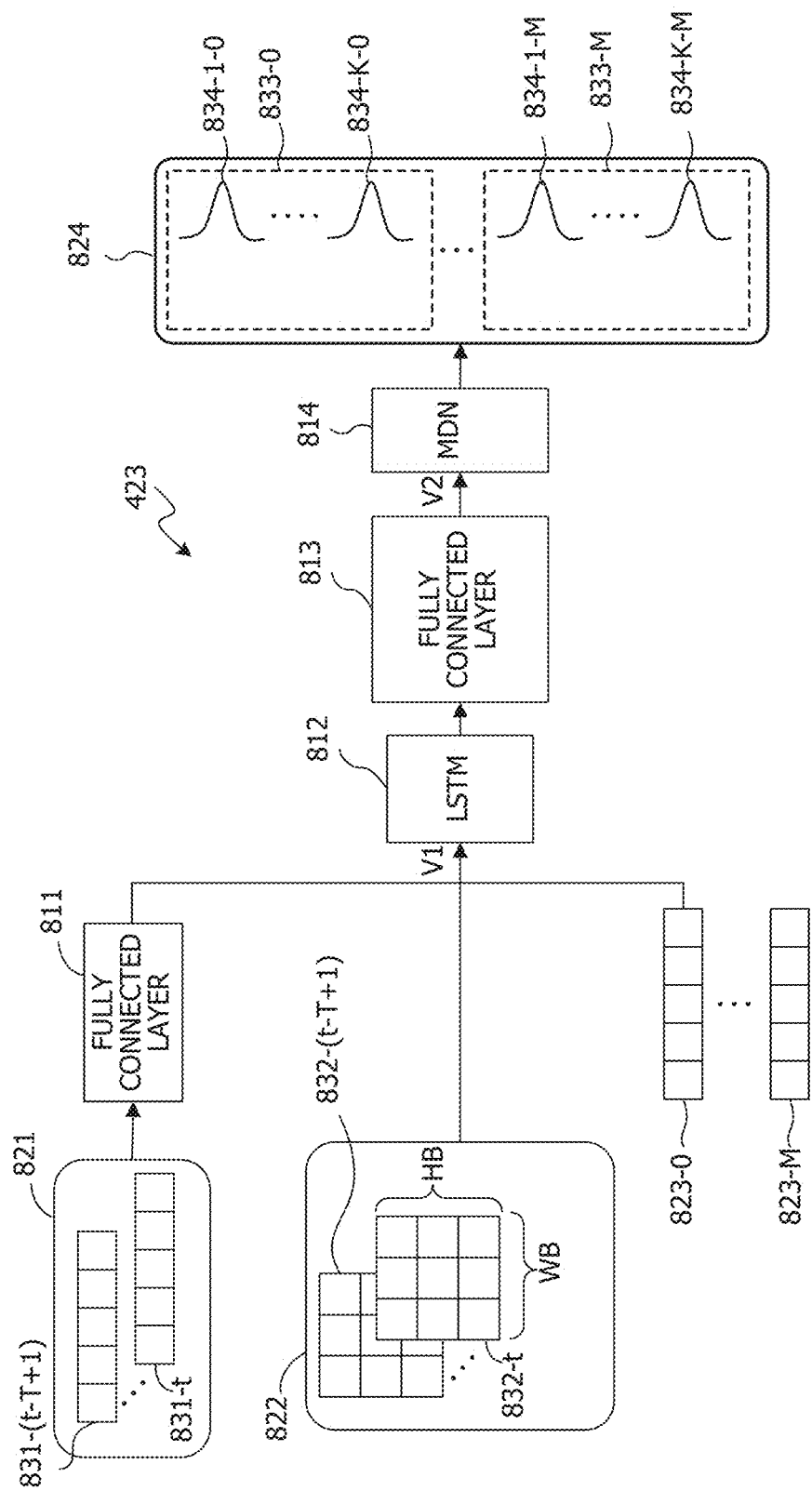

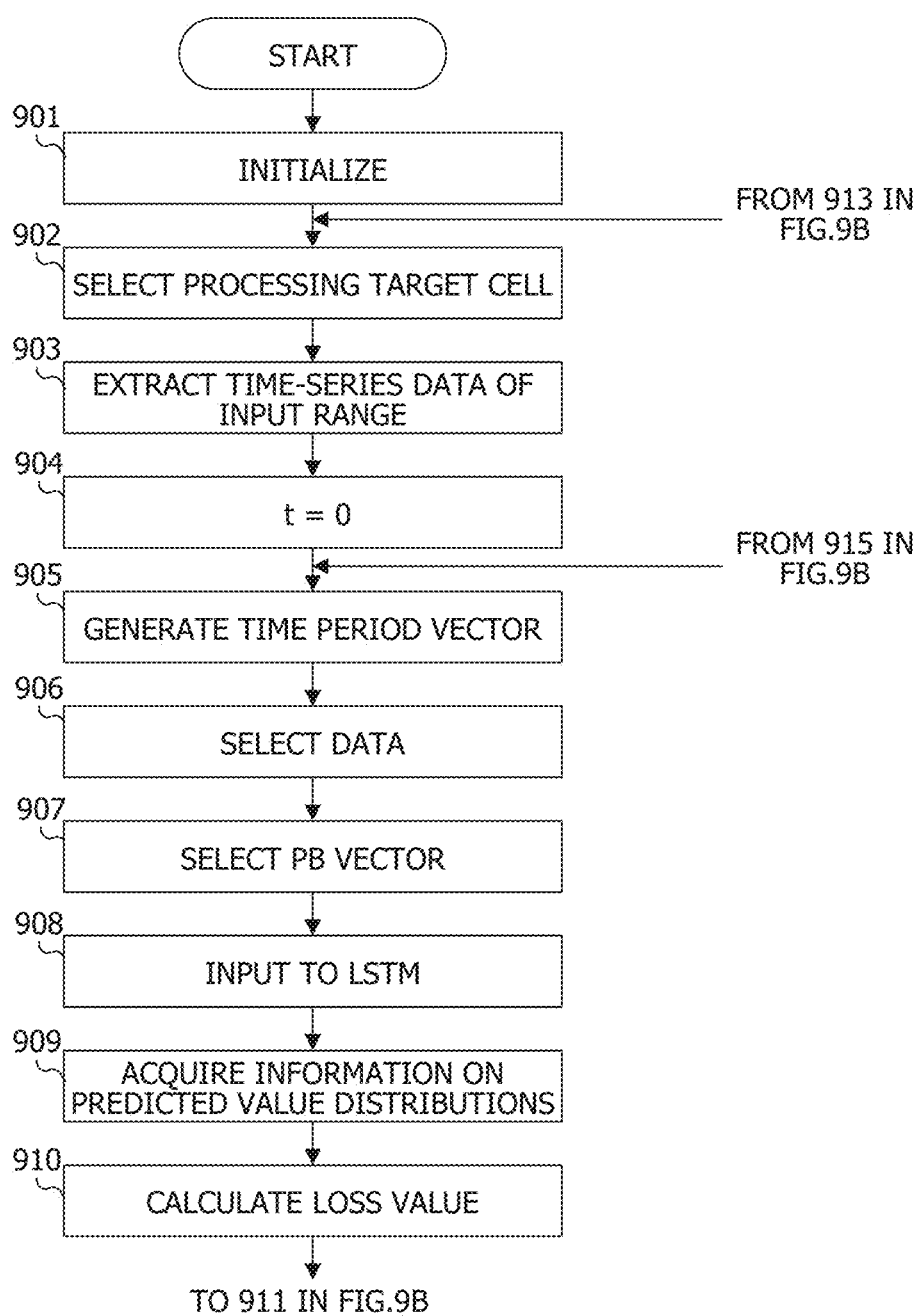

INFORMATION PROCESSING APPARATUS AND PREDICTION METHOD

CROSS-REFERENCE TO RELATED APPLICATION

This application is based upon and claims the benefit of priority of the prior Japanese Patent Application No. 2022-150211, filed on Sep. 21, 2022, the entire contents of which are incorporated herein by reference.

FIELD

The embodiment discussed herein is related to an information processing apparatus and a prediction method.

BACKGROUND

As a use case of time-series prediction, a predicted value may be used as a target value of a subsequent-stage application. For example, in order to perform efficient base station control in a wireless communication system, it is important to predict a communication traffic demand. In this case, the base station control corresponds to the subsequent-stage application, and the predicted communication traffic volume is used as the target value of the control. By appropriately predicting a future communication traffic volume, it is possible to suppress degradation in the overall performance of the wireless communication system.

As a technique for predicting a communication traffic volume, a prediction method using deep reinforcement learning is known.

A communication status prediction apparatus that executes highly accurate prediction processing of a communication failure is also known. A method for measuring and predicting a traffic volume in a network with a small processing load for each interface of a network device is also known. A system for determining a margin requirement is also known.

A vector representation of time is also known. A mixture density network is also known. Self-organization of behavioral primitives is also known.

Japanese Laid-open Patent Publication No. 2020-136937, Japanese Laid-open Patent Publication No. 2016-127360, U.S. Patent Application Publication No. 2020/0226684, and U.S. Patent Application Publication No. 2013/0060673 are disclosed as related art.

C. W. Huang et al., "Mobile Traffic Offloading with Forecasting using Deep Reinforcement Learning", arXiv: 1911.07452v1, 2019, Q. Wu et al., "Deep Reinforcement Learning With Spatio-Temporal Traffic Forecasting for Data-Driven Base Station Sleep Control", *IEEE/ACM Transactions on Networking* VOL. 29, NO. 2, pages 935-948, 2021, S. M. Kazemi et al., "Time2Vec: Learning a Vector Representation of Time", arXiv:1907.05321v1, 2019, C. M. Bishop, "Mixture Density Networks", Aston University, 1994, and J. Tani, "Self-Organization of Behavioral Primitives as Multiple Attractor Dynamics: A Robot Experiment", Proceedings of the 2002 International Joint Conference on Neural Networks, IJCNN'02, pages 489-494, 2002 are disclosed as related art.

SUMMARY

According to an aspect of the embodiment, a non-transitory computer-readable recording medium stores a program for causing a computer to execute a process, the process includes identifying, among pieces of feature information of a plurality of pieces of time-series data, a plurality of pieces of feature information similar to feature information of processing target time-series data, obtaining a predicted value distribution of the processing target time-series data based on each of the plurality of pieces of feature information, obtaining a combined distribution from the predicted value distribution, and determining a range of predicted value for the processing target time-series data based on the combined distribution.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating a prediction model;

FIG. 9A is a flowchart of training processing (part 1);

DESCRIPTION OF EMBODIMENT

In the case where a future communication traffic volume is predicted in a wireless communication system, the predicted value of communication traffic volume may be smaller than the actual communication traffic volume.

Such a problem occurs not only in the case where a communication traffic volume is predicted in a wireless communication system, but also in a case where various kinds of time-series prediction are performed.

Hereinafter, an embodiment will be described in detail with reference to the drawings.

In a case where a future communication traffic volume is predicted in a wireless communication system, the predicted value of communication traffic volume may be smaller than the actual communication traffic volume. In this case, since the predicted value smaller than the actual communication traffic volume is used as a target value in subsequent-stage base station control, there is a possibility that undesirable control is performed. For example, undesirable control is control that causes degradation in user quality such that a user terminal is not coupled to a base station.

As a simple approach to solve this problem, there is a method in which a predicted value is excessively estimated by adding a margin to the predicted value. By adding a sufficiently large margin designed in advance to a predicted value, the possibility that the user quality in a subsequent-stage application is affected is reduced. In practice, a predicted value is excessively estimated in many wireless communication systems.

Figure 1:
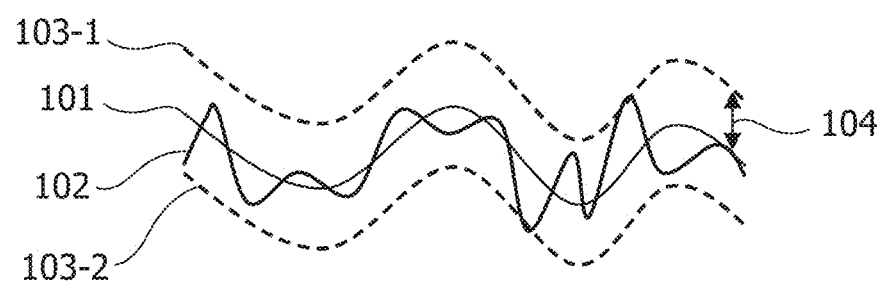
FIG. 1 is a diagram illustrating a margin for a predicted value.

FIG. 1 illustrates an example of a margin for a predicted value. A curved line 101 represents a temporal change of the predicted value of communication traffic volume, and a curved line 102 represents a temporal change of the actual communication traffic volume. A broken line 103-1 represents an upper limit of the margin for the predicted value, and a broken line 103-2 represents a lower limit of the margin for the predicted value. An arrow 104 represents an upper margin of the predicted value.

Designing of a margin for a predicted value and prediction performance are in a trade-off relationship. A larger margin enables stable operation, but causes a larger prediction error, resulting in reduced control efficiency in a subsequent-stage application. On the other hand, a smaller margin causes unstable operation, but reduces the prediction error, resulting in suppression of reduced control efficiency in the subsequent-stage application.

Figure 2:
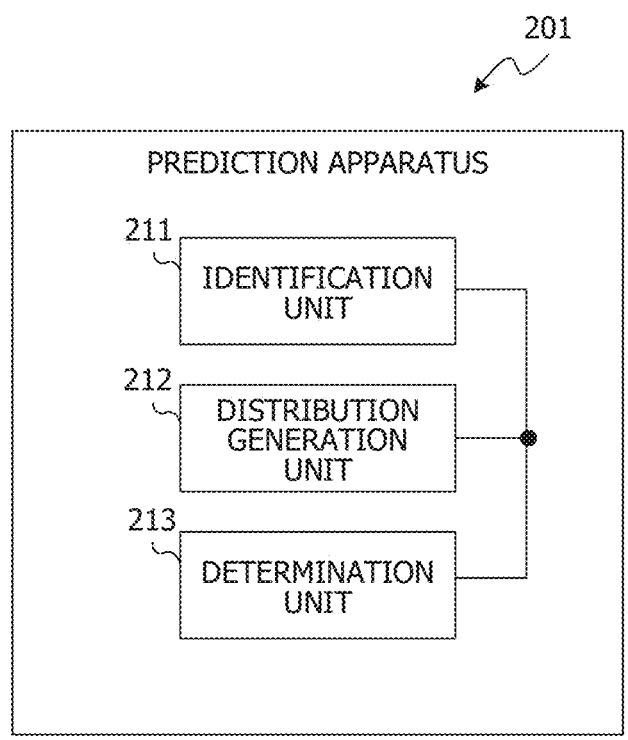
FIG. 2 is a diagram illustrating a functional configuration of a prediction apparatus according to an embodiment.

FIG. 2 illustrates an example of a functional configuration of a prediction apparatus according to the embodiment. A prediction apparatus 201 in FIG. 2 includes an identification unit 211, a distribution generation unit 212, and a determination unit 213.

Figure 3:
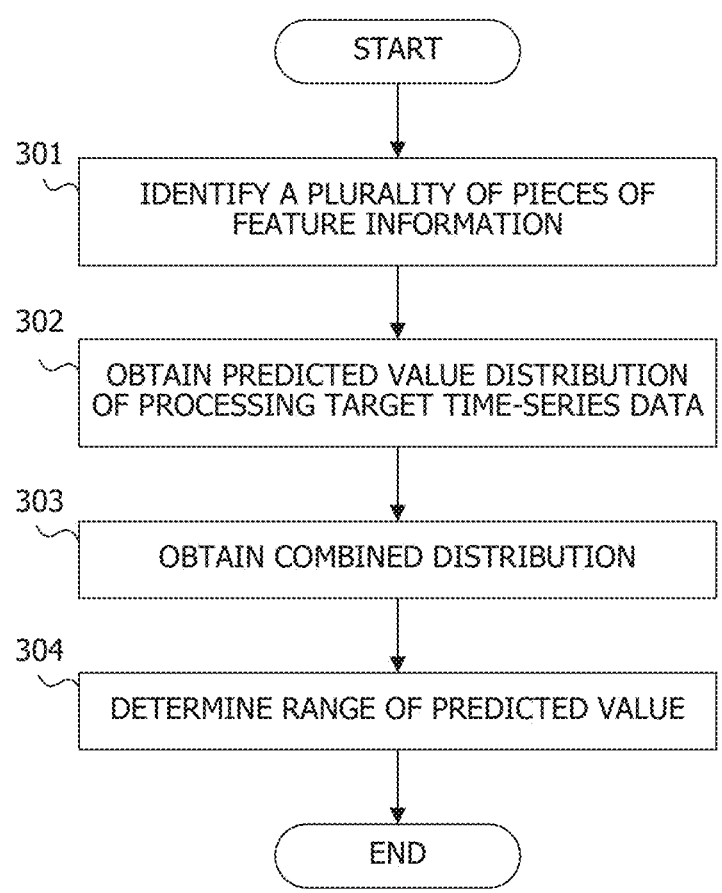
FIG. 3 is a flowchart of first prediction processing.

FIG. 3 is a flowchart illustrating an example of first prediction processing performed by the prediction apparatus 201 in FIG. 2. First, the identification unit 211 identifies a plurality of pieces of feature information similar to the feature information of processing target time-series data among pieces of feature information of a plurality of pieces of time-series data (step 301).

Next, the distribution generation unit 212 obtains a predicted value distribution of the processing target time-series data based on each of the plurality of pieces of feature information (step 302), and obtains a combined distribution from the predicted value distribution obtained based on each of the plurality of pieces of feature information (step 303). Next, the determination unit 213 determines a range of predicted value for the processing target time-series data based on the combined distribution (step 304).

The prediction apparatus 201 in FIG. 2 may improve the prediction accuracy of time-series prediction.

Figure 4:
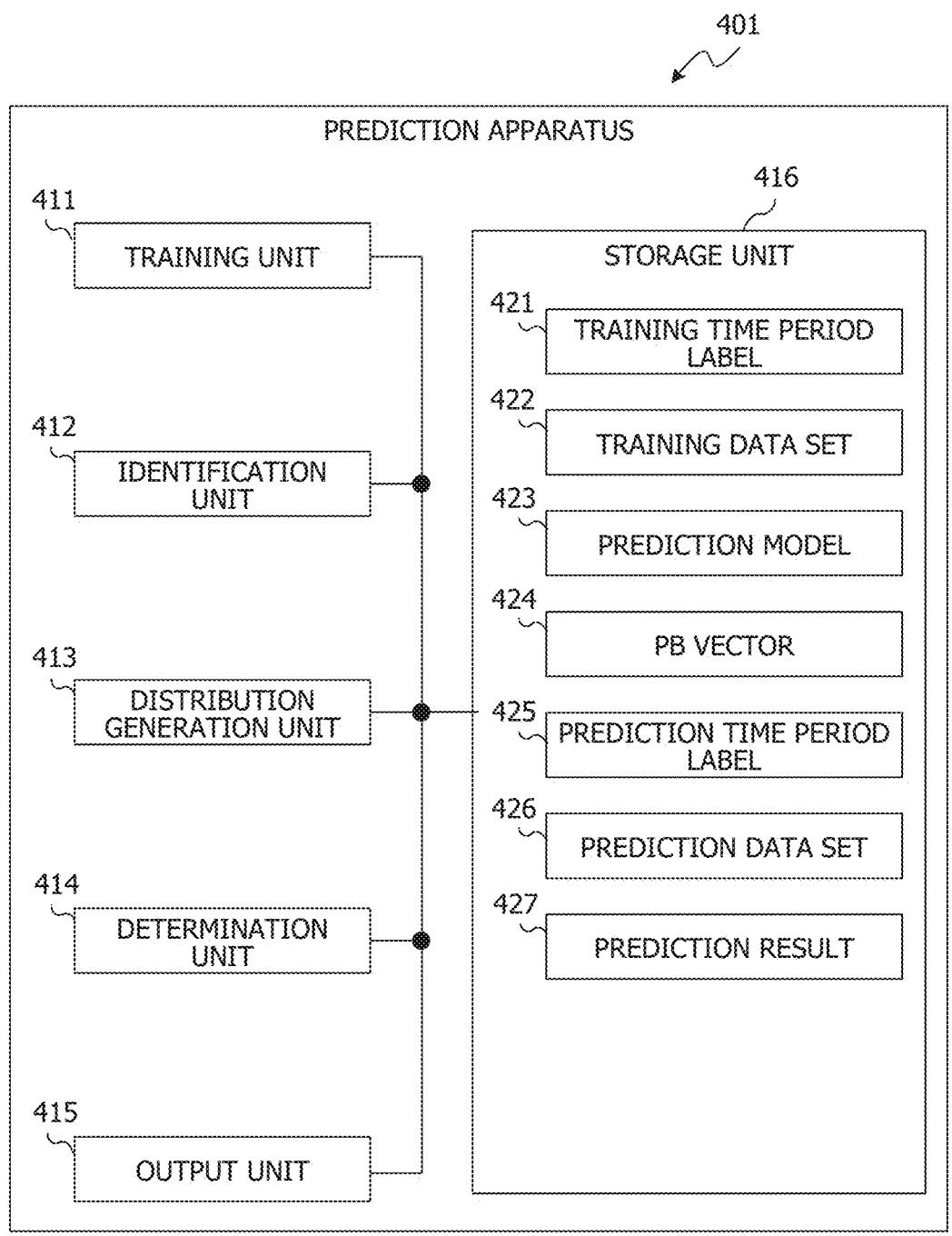
FIG. 4 is a diagram illustrating a functional configuration of a specific example of the prediction apparatus.

FIG. 4 illustrates a specific example of the prediction apparatus 201 in FIG. 2. A prediction apparatus 401 in FIG. 4 includes a training unit 411, an identification unit 412, a distribution generation unit 413, a determination unit 414, an output unit 415, and a storage unit 416, and performs training processing and prediction processing.

The identification unit 412, the distribution generation unit 413, and the determination unit 414 correspond to the identification unit 211, the distribution generation unit 212, and the determination unit 213 in FIG. 2, respectively.

In the prediction processing, a distribution of predicted values that is data at a time later than a predetermined time period is obtained from time-series data including data at each time in the predetermined time period. Data at each time may be a communication traffic volume in a wireless communication system, or may be an amount of traffic of vehicles, flow of people, weather information, economic information, or the like.

Weather information includes weather, temperature, humidity, precipitation amount, precipitation probability, wind direction, wind strength, and the like. Economic information includes stock prices, exchange rates, economic growth rates, product sales, number of customers at a retail store, real estate prices, and the like.

In the training processing, the storage unit 416 stores a training time period label 421 and a training data set 422.

Figure 5:
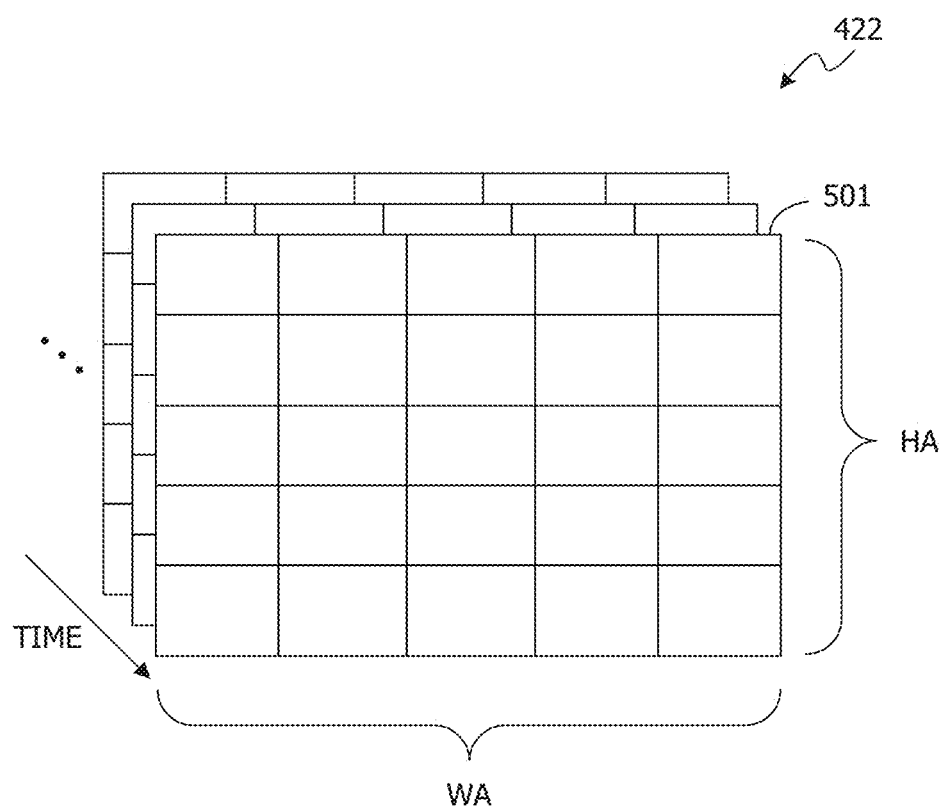
FIG. 5 is a diagram illustrating a training data set.

FIG. 5 illustrates an example of the training data set 422. The training data set 422 in FIG. 5 includes a data set 501 at each of a plurality of times. The data set 501 at each time includes WA*HA cells. WA represents the number of cells arranged in the horizontal direction of the data set 501, and HA represents the number of cells arranged in the vertical direction of the data set 501. WA and HA are hyperparameters and are integers equal to or larger than 2. Each cell corresponds to an area where data is acquired, and includes data acquired in the area. Identification information for identifying an area is given to each cell.

For example, in a case where the acquired data is communication traffic volume, each cell may correspond to a region such as a city, a town, or a village, and the WA*HA cells may correspond to a prefecture. Data at each of a plurality of times in each cell corresponds to time-series data. Data at each time is normalized to be a value in the range of [0, 1].

The training time period label 421 includes one-hot vectors associated with each data set 501 included in the training data set 422. A one-hot vector is a 24-dimensional vector representing 24 hours from 0:00 to 24:00, and each element corresponds to a period of one hour. Of the 24 elements of a one-hot vector, only an element corresponding to a period to which a time at which the data set 501 is acquired belongs is 1, and the other elements are 0.

The training unit 411 generates a prediction model 423 by training a machine learning model by machine learning using the training time period label 421 and the training data set 422, and stores the prediction model 423 in the storage unit 416. The prediction model 423 is a trained model.

In the prediction processing, the prediction apparatus 401 predicts the data of a processing target cell at time step t+1 by using the prediction model 423 and the time-series data of the processing target cell from time step t−T+1 to time step t. Time step t−T+1 to time step t−1 corresponds to past times, time step t corresponds to a current time, and time step t+1 corresponds to a future time.

In this case, time-series data for T times from time step t−T+1 to time step t is input to the prediction model 423. T is a hyperparameter and represents a window width related to a time step. t is an integer equal to or larger than 0, and T is an integer equal to or larger than 2.

Time-series data of a processing target cell in the prediction processing corresponds to processing target time-series data. The period from time step t−T+1 to time step t in the prediction processing corresponds to a predetermined time period, and time step t+1 corresponds to a time later than the predetermined time period.

The training data set 422 includes the data set 501 at each time step from time step 1-T to time step tN. tN is an integer equal to or larger than 1. The training time period label 421 includes one-hot vectors indicating the acquisition time of each data set 501.

Figure 6:
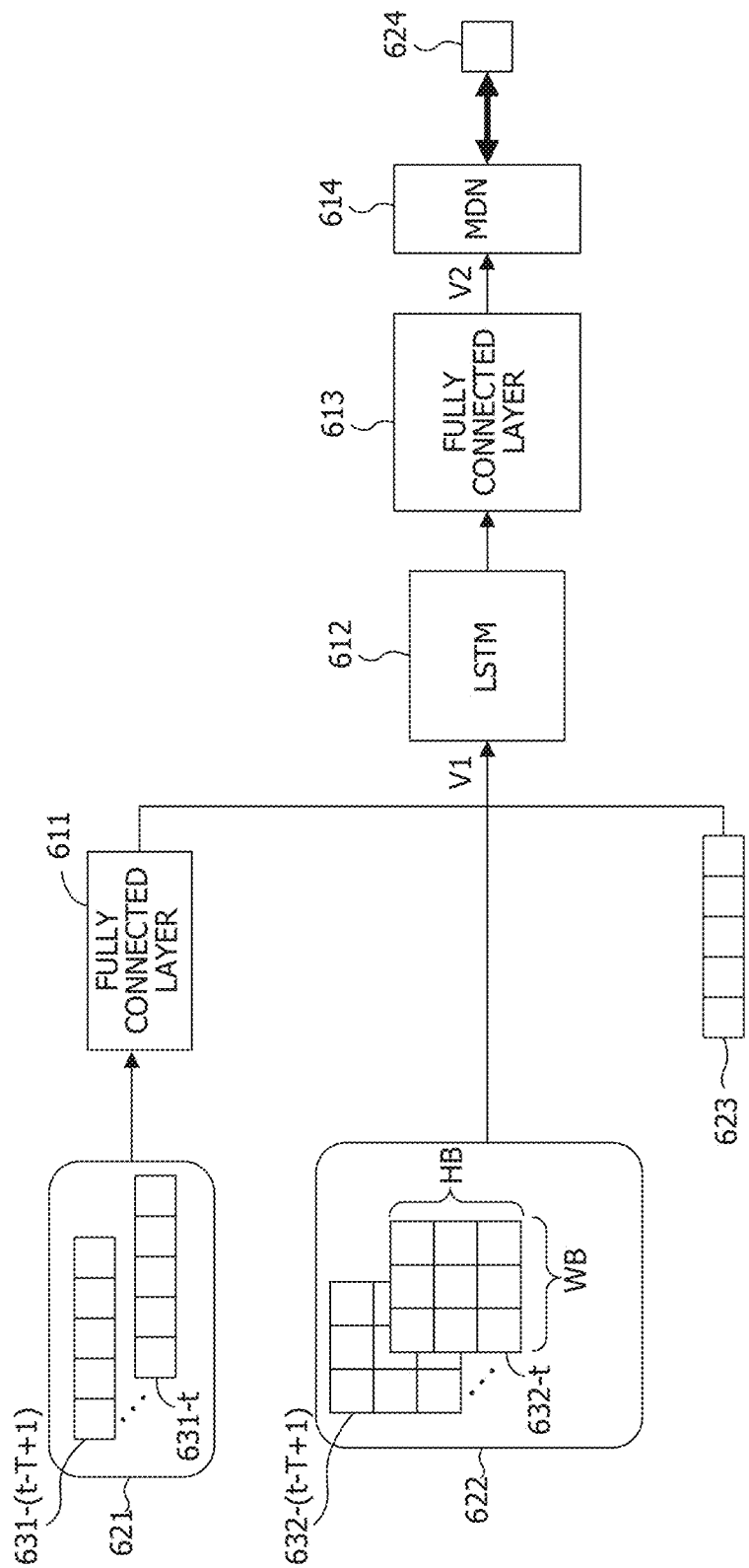
FIG. 6 is a diagram illustrating a machine learning model.

FIG. 6 illustrates an example of a machine learning model used in machine learning. The machine learning model in FIG. 6 includes a fully connected layer 611, a long short-term memory (LSTM) 612, a fully connected layer 613, and a mixture density network (MDN) 614. The LSTM 612 is a type of a recurrent neural network (RNN).

In the training processing, the training unit 411 performs training for predicting the data of a processing target cell at time step t+1 by using the time-series data of the processing target cell from time step t−T+1 to time step t.

In this training, the training unit 411 inputs an input one-hot vector 621 to the fully connected layer 611. The input one-hot vector 621 includes one-hot vectors 631-(t−T+1) to 631-t extracted from the training time period label 421. Each one-hot vector 631-i (i=t−T+1 to t) indicates a time corresponding to time step i.

The period from time step t−T+1 to time step t in the training processing is an example of a specific time period, and the input one-hot vector 621 is an example of time period information indicating the specific time period.

The fully connected layer 611 outputs a D1-dimensional vector corresponding to each one-hot vector 631-i. The training unit 411 generates a time period vector including D1*T elements from T D1-dimensional vectors output from the fully connected layer 611. D1 is a hyperparameter and is an integer equal to or larger than 1. S. M. Kazemi et al., "Time2Vec: Learning a Vector Representation of Time", arXiv:1907.05321v1, 2019 discloses that a vector representing an event flag such as a time period is effective for improving prediction accuracy.

A parametric bias (PB) vector indicating the feature of time-series data is prepared corresponding to each cell of the data set 501.

A PB vector is a D2-dimensional vector, and the number of PB vectors is WA*HA. D2 is a hyperparameter and is an integer equal to or larger than 1. At the start of the training processing, all PB vectors are initialized.

A PB vector is a parameter that is additionally prepared as the input of the LSTM 612. For example, it is described in J. Tani, "Self-Organization of Behavioral Primitives as Multiple Attractor Dynamics: A Robot Experiment", Proceedings of the 2002 International Joint Conference on Neural Networks, IJCNN'02, pages 489-494, 2002. The value of each PB vector is determined by performing machine learning. A parameter indicating the behavior of each piece of time-series data may be obtained by learning the value of PB vector for each piece of time-series data. A PB vector corresponds to feature information of time-series data.

The training unit 411 inputs, to the LSTM 612, a vector V1 obtained by connecting the time period vector, an input data set 622, and a PB vector 623.

The input data set 622 includes data sets 632-(t−T+1) to 632-t. Each data set 632-i (i=t−T+1 to t) includes the data of cells in a range of WB*HB centered on a processing target cell in the data set 501 of time step i included in the training data set 422.

WB represents the number of cells arranged in the horizontal direction, and HB represents the number of cells arranged in the vertical direction. WB and HB are hyperparameters. WB is an integer equal to or larger than 2 and equal to or smaller than WA, and HB is an integer equal to or larger than 2 and equal to or smaller than HA. The training unit 411 may generate the vector V1 by resizing the input data set 622 into a shape capable of connection.

As the PB vector 623, a PB vector corresponding to a processing target cell is used among the WA*HA PB vectors.

The LSTM 612 includes a D3-dimensional internal state and L hidden layers. A neural network including the LSTM 612 and the fully connected layer 613 generates a vector V2 from the vector V1, and outputs the vector V2 to the MDN 614. The vector V2 is a D4-dimensional vector. L, D3, and D4 are hyperparameters, and are integers equal to or larger than 1.

The MDN 614 generates Gaussian mixture distribution information from the vector V2, and outputs the information. A Gaussian mixture distribution is a predicted value distribution obtained by mixing K predicted value distributions. Each of the K predicted value distributions represents the distribution of predicted values of data of a processing target cell at time step t+1. K is a hyperparameter and is an integer equal to or larger than 2. For example, an MDN is described in C. M. Bishop, "Mixture Density Networks", Aston University, 1994.

Figure 7:
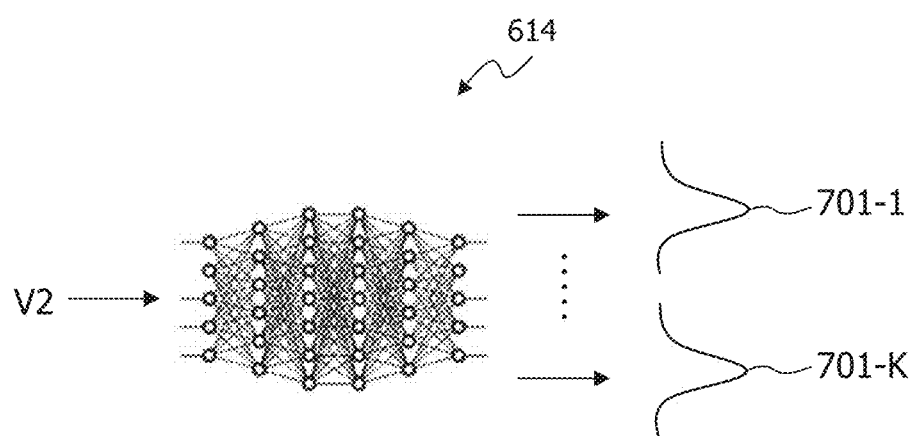
FIG. 7 is a diagram illustrating a mixture density network (MDN)

FIG. 7 illustrates an example of the MDN 614. The MDN 614 in FIG. 7 generates information on predicted value distributions 701-1 to 701-K with the vector V2 as input, and outputs the information as Gaussian mixture distribution information. The information on predicted value distributions 701-k (k=1 to K) includes a mixing coefficient n(k), an average value p(k), and a variance v(k) of the predicted value distributions 701-k.

The training unit 411 calculates a loss value Q by the following formula using the Gaussian mixture distribution information output from the MDN 614 and a teaching signal 624.

$$Q = -\ln(\Sigma_{k=1}^{K} \pi(k) N(y|\mu(k)\Sigma(k))) \tag{1}$$

y represents correct answer data of time step t+1 indicated by the teaching signal 624. l(k) represents a variance-covariance matrix calculated from the vector V2 and the information on the predicted value distributions 701-k. $N(y|\mu(k)\Sigma(k))$ represents a probability density function of the predicted value distributions 701-k. The total sum symbol represents a total sum of $n(k)N(y|\mu(k)\Sigma(k))$ for k=1 to K. The loss value Q represents negative log likelihood.

By repeating the processing of calculating the loss value Q in this manner for t=0 to tN, the loss value Q at each of tN+1 time steps t is calculated.

The training unit 411 feeds back an error by back propagation using the loss value Q as the error. Accordingly, the weight parameters of the fully connected layer 611, the LSTM 612, the fully connected layer 613, and the MDN 614 and the PB vector 623 are updated such that the loss value Q is minimized. For example, backpropagation through time (BPTT) is used as back propagation.

By repeating the processing of updating each weight parameter and the PB vector 623 in this manner for each cell of the data set 501, each weight parameter and each PB vector are optimized.

In a case where each weight parameter is fixed, the output of the MDN 614 is determined based only on the PB vector 623, the input one-hot vector 621, and the input data set 622. Therefore, each optimized PB vector indicates the feature of time-series data of each cell, and a feature space representing the feature of time-series data of the cells is formed by the PB vectors of the WA*HA cells.

The training unit 411 stores the machine learning model including the optimized weight parameters in the storage unit 416 as the prediction model 423, and stores the optimized WA*HA PB vectors in the storage unit 416 as PB vectors 424.

In the prediction processing, the storage unit 416 stores a prediction time period label 425 and a prediction data set 426.

The prediction data set 426 includes the data set at each time step from time step 1-T to time step t. The data set at each time step includes WA*HA cells similarly to the data set 501 in FIG. 5. Each cell includes data acquired in a corresponding area. The prediction time period label 425 includes one-hot vectors associated with each data set included in the prediction data set 426.

The prediction apparatus 401 performs the prediction processing by using the prediction model 423, the prediction time period label 425, and the prediction data set 426. In the prediction processing, the prediction apparatus 401 predicts the data of a processing target cell at time step t+1 by using the time-series data of the processing target cell from time step t−T+1 to time step t.

FIG. 8 illustrates an example of the prediction model 423 used in the prediction processing. The prediction model 423 in FIG. 8 includes a fully connected layer 811, an LSTM 812, a fully connected layer 813, and an MDN 814. The fully connected layer 811, the LSTM 812, the fully connected layer 813, and the MDN 814 respectively correspond to the fully connected layer 611, the LSTM 612, the fully connected layer 613, and the MDN 614 in which weight parameters optimized by the training processing are set.

The identification unit 412 identifies, among the PB vectors 424, a plurality of PB vectors similar to the PB vector of a processing target cell by comparing the PB vector of the processing target cell with each PB vector 424.

For example, the identification unit 412 calculates the distance between the PB vector of the processing target cell and the PB vector of another cell among the PB vectors 424. The distance between two PB vectors may be a Euclidean distance or a Manhattan distance. The identification unit 412 extracts M PB vectors in ascending order of distance as M PB vectors in the neighborhood of the PB vector of the processing target cell. M is a hyperparameter and is an integer equal to or larger than 1.

By extracting M PB vectors in the neighborhood from the PB vectors 424, it is possible to identify a parameter of time-series data of another cell exhibiting a behavior similar to that of the time-series data of the processing target cell.

For example, in a case where the acquired data is communication traffic volume, since the pieces of time-series data of a plurality of cells corresponding to geographically close regions exhibit similar behaviors, the distance between the PB vectors of the cells is short in many cases.

A PB vector 823-0 corresponds to the PB vector of the processing target cell, and PB vectors 823-1 to 823-M correspond to M PB vectors in the neighborhood. The PB vectors 823-0 to 823-M correspond to a plurality of pieces of feature information similar to the feature information of processing target time-series data.

The distribution generation unit 413 inputs an input one-hot vector 821 to the fully connected layer 811. The input one-hot vector 821 includes one-hot vectors 831-(t−T+1) to 831-t extracted from the prediction time period label 425. Each one-hot vector 831-i (i=t−T+1 to t) indicates a time corresponding to time step i. The input one-hot vector 821 is an example of time period information indicating a predetermined time period.

The fully connected layer 811 outputs a D1-dimensional vector corresponding to each one-hot vector 831-i. The distribution generation unit 413 generates a time period vector including D1*T elements from T D1-dimensional vectors output from the fully connected layer 811.

The distribution generation unit 413 selects any PB vector 823-m (m=0 to M) from among the PB vectors 823-0 to 823-M. The distribution generation unit 413 inputs, to the LSTM 812, a vector V1 obtained by connecting the time period vector, an input data set 822, and the PB vector 823-m.

The input data set 822 includes data sets 832-(t−T+1) to 832-t. Each data set 832-i (i=t−T+1 to t) includes the data of cells in a range of WB*HB centered on a processing target cell in the data set of time step i included in the prediction data set 426. The distribution generation unit 413 may generate the vector V1 by resizing the input data set 822 into a shape capable of connection.

A neural network including the LSTM 812 and the fully connected layer 813 generates a vector V2 from the vector V1, and outputs the vector V2 to the MDN 814. The MDN 814 generates Gaussian mixture distribution information from the vector V2, and outputs the information. By repeating such processing for the PB vectors 823-0 to 823-M, (M+1) pieces of Gaussian mixture distribution information are generated.

Output information 824 output from the MDN 814 includes Gaussian mixture distribution information 833-0 to Gaussian mixture distribution information 833-M. Gaussian mixture distribution information 833-m (m=0 to M) is generated from the PB vector 823-m, and includes information on predicted value distributions 834-1-m to 834-K-m.

The information on predicted value distributions 834-k-m (k=1 to K) includes a mixing coefficient n(k, m), an average value μ(k, m), a variance v(k, m), and a standard deviation σ(k, m) of the predicted value distributions 834-k-m. The predicted value distributions 834-k-0 to 834-k-M correspond to predicted value distributions obtained based on each of a plurality of pieces of feature information.

By using the prediction model 423 generated by machine learning, (M+1)*K predicted value distributions 834-k-m may be easily obtained from the input one-hot vector 821, the input data set 822, and (M+1) PB vectors 823-m.

By inputting the time period vector generated from the input one-hot vector 821 to the LSTM 812, information on the time period in which the input data set 822 is acquired is reflected in the prediction result. Accordingly, different prediction results may be generated from the same time-series data according to time period, and the accuracy of prediction results is improved.

Using a distance l(m) between the PB vector 823-0 and the PB vector 823-m, the distribution generation unit 413 sets a coefficient α(m) for adjusting the mixing coefficient π(k, m). Here, l(0)=0. The coefficient α(m) is set to be larger as l(m) becomes smaller. For example, the distribution generation unit 413 calculates the coefficient α(m) by the following formula.

$$\alpha(m) = \begin{cases} 0 & (\sigma(k, m) > \Delta) \\ \dfrac{1/(l(m) + \varepsilon)}{\sum_{m=0}^{M} 1/(l(m) + \varepsilon)} & (\sigma(k, m) \leq \Delta) \end{cases} \quad (2)$$

Δ represents a threshold for excluding a predicted value distribution in which variation of predicted values is too large. ε represents a small value for suppressing division by 0. Δ and ε are hyperparameters.

Next, the distribution generation unit 413 obtains a Gaussian mixture distribution in which (M+1)*K predicted value distributions 834-k-m are mixed. This Gaussian mixture distribution corresponds to the combined distribution obtained in step 303 in FIG. 3. The distribution generation unit 413 calculates a probability density function P(x) of the combined distribution by the following formula.

$$P(x) = \Sigma_{m=0}^{M} \Sigma_{k=1}^{K} \alpha(m)\pi(k,m)N(x|\mu(k,m)\Sigma(k,m)) \quad (3)$$

Σ(k, m) represents a variance-covariance matrix calculated from the information on the predicted value distributions **834-*k*-*m*. N(x|μ(k, m)Σ(k, m)) represents a probability density function of the predicted value distributions 834-*k*-*m*.**

The total sum symbol for k=1 to K represents a total sum of α(m)π(k, m)N(x|p(k, m)Σ(k, m)) for k=1 to K. The total sum symbol for m=0 to M represents a total sum obtained by adding up, for m=0 to M, the total sum of α(m)π(k, m)N(x|μ(k, m)Σ(k, m)) for k=1 to K.

By calculating P(x) by formula (2) and formula (3), ensemble prediction using M+1 PB vectors is performed, and the predicted value distributions **834-*k*-*m*** having σ(k, m) equal to or smaller than Δ are mixed based on l(m). Accordingly, the variance and standard deviation of the combined distribution are adjusted, and the accuracy related to variation of predicted values is improved.

The determination unit 414 calculates a predicted value and a confidence interval of the predicted value from the combined distribution. For example, the determination unit 414 may sample a plurality of pieces of data from the combined distribution, and use a statistical value of these pieces of data as the predicted value. The statistical value may be an average value, a median value, a maximum value, or a minimum value.

The determination unit 414 may calculate a confidence interval by using an interval estimation method such as a highest density region method. The calculated confidence interval corresponds to a range of predicted value for the processing target time-series data, and is used in a subsequent-stage application as a reference value of a margin for a predicted value. A user may determine the size of a margin according to a use case.

The determination unit 414 generates a prediction result 427 including the predicted value and the confidence interval, and stores the prediction result in the storage unit 416. The output unit 415 outputs the prediction result 427.

In a case where M PB vectors in the neighborhood are close to each other within a feature space represented by PB vectors, stable prediction may be performed since the variance of combined distribution is small and the confidence interval is narrow. Accordingly, since the prediction accuracy of time-series prediction is improved and the prediction error is reduced, reduction of control efficiency is suppressed in a subsequent-stage application in which a predicted value is used as a target value.

By contrast, in a case where the M PB vectors in the neighborhood are away from each other, prediction is unstable since the variance of combined distribution is large and the confidence interval is wide.

Since the behavior of time-series data of each cell changes according to the time period to which the time-series data belongs, the confidence interval is narrow in a time period in which prediction is stable, such as nighttime, and the confidence interval is wide in a time period in which prediction is unstable, such as daytime.

Figure 9B:
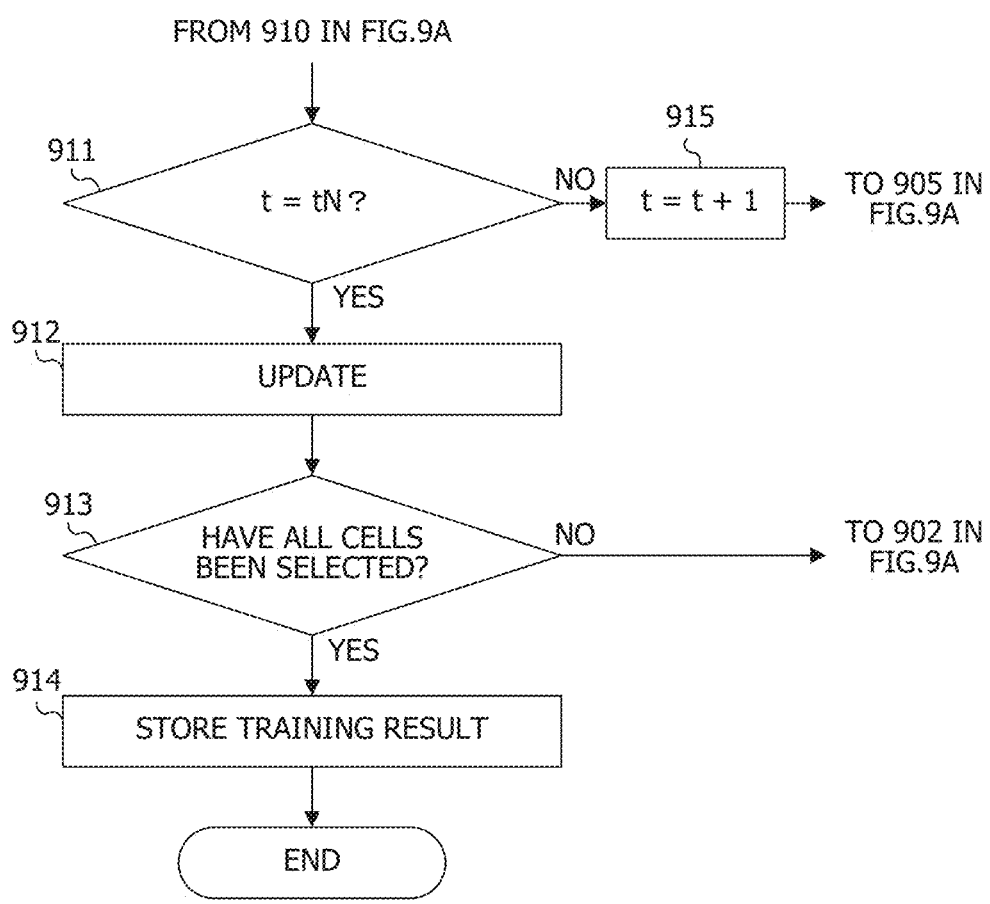
FIG. 9B is a flowchart of training processing (part 2)

FIGS. 9A and 9B are flowcharts illustrating an example of training processing performed by the prediction apparatus 401 in FIG. 4. First, the training unit 411 randomly initializes the weight parameters of the fully connected layer 611, the LSTM 612, the fully connected layer 613, and the MDN 614 and WA*HA PB vectors 623 (step 901).

Next, the training unit 411 selects a processing target cell from among WA*HA cells (step 902), and extracts the time-series data of each cell of input range from the training data set 422 (step 903). The cells of input range are cells in a range of WB*HB centered on the processing target cell.

Next, the training unit 411 sets 0 for time step t (step 904). The training unit 411 inputs the input one-hot vector 621 at time step t to the fully connected layer 611, and generates a time period vector by using the output of the fully connected layer 611 (step 905).

Next, the training unit 411 selects data for T times in time step t−T+1 to time step t from the time-series data of each cell of input range, and generates the input data set 622 (step 906).

Next, the training unit 411 selects the PB vector 623 of the processing target cell from among the WA*HA PB vectors (step 907).

Next, the training unit 411 inputs, to the LSTM 612, the vector V1 obtained by connecting the time period vector, the input data set 622, and the PB vector 623 (step 908). The training unit 411 acquires the information on K predicted value distributions **701-*k* output from the MDN 614 (step 909**).

Next, the training unit 411 calculates a loss value Q by formula (1) using the information on K predicted value distributions **701-*k* and the teaching signal 624 (step 910), and compares t with tN (step 911). When t is less than tN (NO in step 911), the training unit 411 increments t by 1 (step 915) and repeats the processing of step 905** and subsequent steps.

When t reaches tN (YES in step 911), the training unit 411 performs the processing of step 912. In step 912, the training unit 411 updates the weight parameters of the fully connected layer 611, the LSTM 612, the fully connected layer 613, and the MDN 614 and the PB vector 623 by using the loss value Q as an error and feeding back the error by back propagation.

Next, the training unit 411 checks whether all cells have been selected (step 913). When an unselected cell remains (NO in step 913), the training unit 411 repeats the processing of step 902 and subsequent steps for the next cell.

When all cells have been selected (YES in step 913), the training unit 411 stores the prediction model 423 and the PB vectors 424 in the storage unit 416 as a training result (step 914). The prediction model 423 is a machine learning model including the optimized weight parameters, and the PB vectors 424 are the optimized WA*HA PB vectors.

Figure 10A:
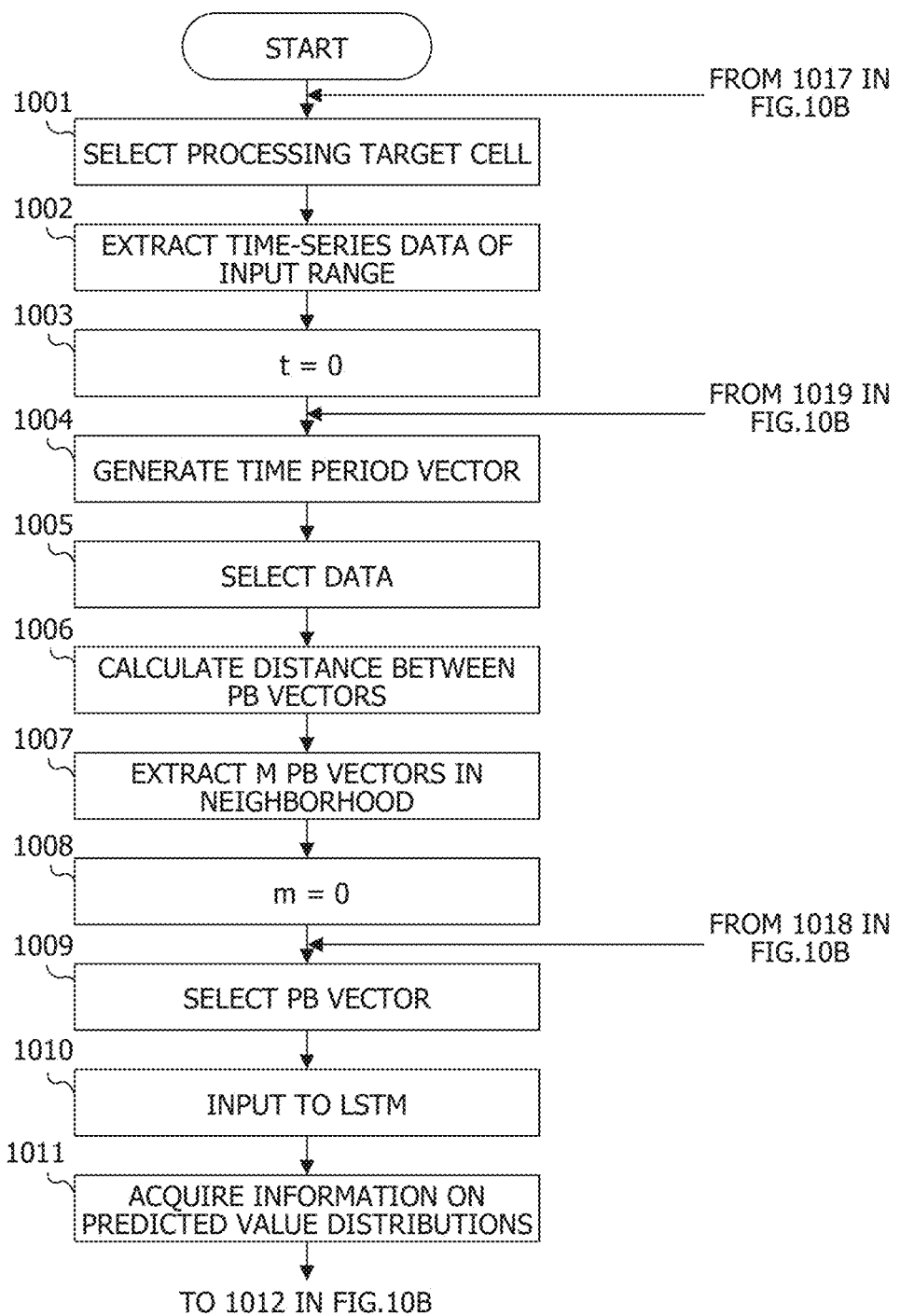
FIG. 10A is a flowchart of second prediction processing (part 1)
Figure 10B:
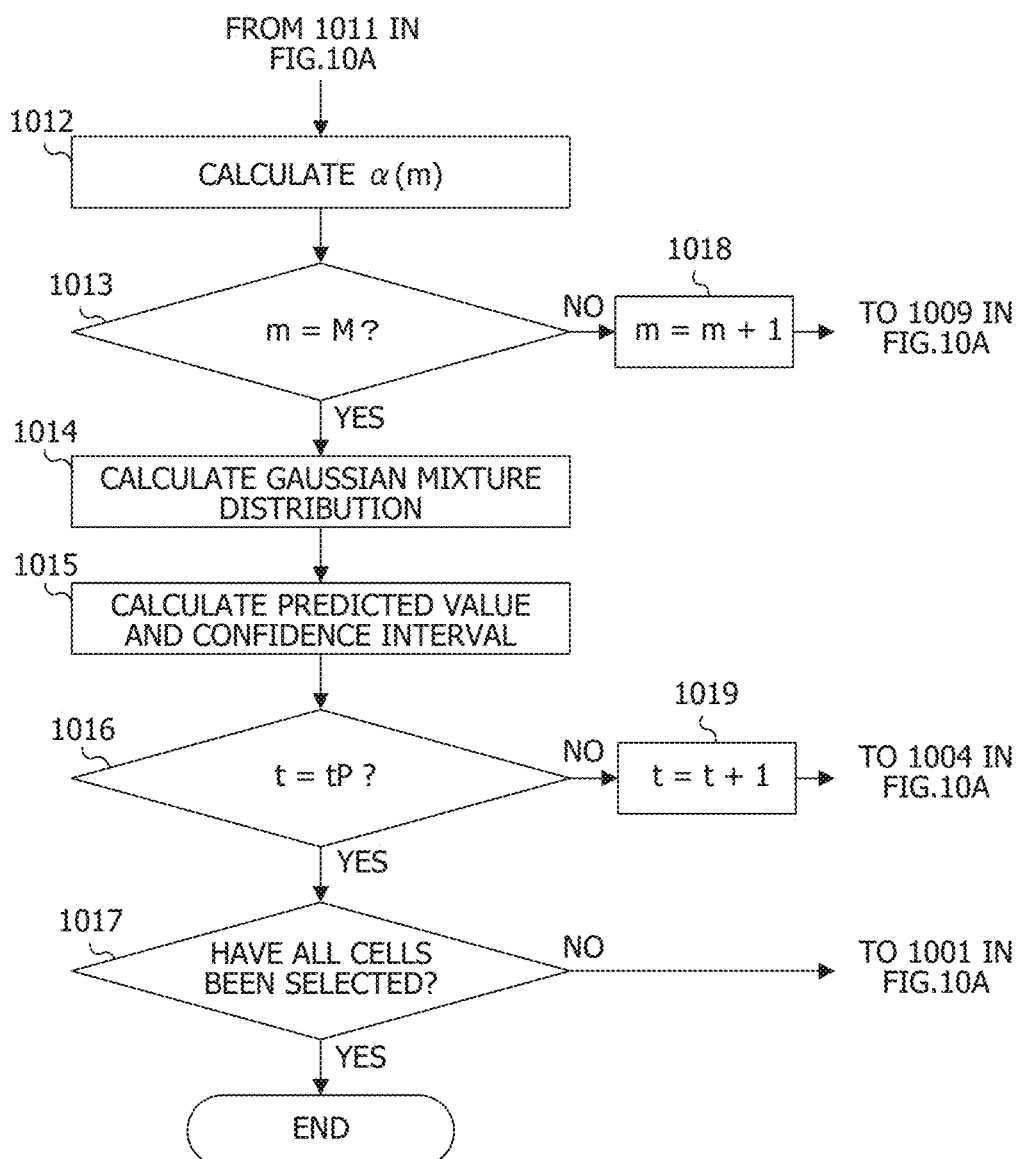
FIG. 10B is a flowchart of second prediction processing (part 2)

FIGS. 10A and 10B are flowcharts illustrating an example of second prediction processing performed by the prediction apparatus 401 in FIG. 4. In the second prediction processing, an environment in which the observed values of data of each cell are sequentially acquired is assumed. Therefore, in each time step t of t=0 to tP, the data set at each time step from time step 1-T to time step t is included in the prediction data set 426. tP is an integer equal to or larger than 0, and represents a time step corresponding to the last time at which the prediction processing is performed.

First, the distribution generation unit 413 selects a processing target cell from among WA*HA cells (step 1001), and extracts the time-series data of each cell of input range from the prediction data set 426 (step 1002). The cells of input range are cells in a range of WB*HB centered on the processing target cell.

Next, the distribution generation unit 413 sets 0 for time step t (step 1003). The distribution generation unit 413 inputs the input one-hot vector 821 at time step t to the fully connected layer 811, and generates a time period vector by using the output of the fully connected layer 811 (step 1004).

Next, the distribution generation unit 413 selects data for T times in time step t−T+1 to time step t from the time-series data of each cell of input range, and generates the input data set 822 (step 1005).

Next, the identification unit 412 calculates the distance between the PB vector of the processing target cell and the PB vector of another cell among the PB vectors 424 (step 1006), and extracts M PB vectors in the neighborhood (step 1007). The PB vector of the processing target cell is used as the PB vector 823-0, and the M PB vectors in the neighborhood are used as the PB vectors 823-1 to 823-M.

Next, the distribution generation unit 413 sets 0 for control variable m (step 1008) and selects the m-th PB vector 823-*m* (step 1009).

Next, the distribution generation unit 413 inputs, to the LSTM 812, the vector V1 obtained by connecting the time period vector, the input data set 822, and the PB vector 823-*m* (step 1010). The distribution generation unit 413 acquires the information on K predicted value distributions 834-1-*m* to 834-K-*m* output from the MDN 814 (step 1011).

Next, the distribution generation unit 413 calculates a coefficient α(m) by formula (2) (step 1012), and compares m with M (step 1013). When m is less than M (NO in step 1013), the distribution generation unit 413 increments m by 1 (step 1018), and the prediction apparatus 401 repeats the processing of step 1009 and subsequent steps.

When m reaches M (YES in step 1013), the distribution generation unit 413 calculates a probability density function P(x) of a Gaussian mixture distribution in which (M+1)*K predicted value distributions 834-*k*-*m* are mixed, by using formula (3) (step 1014).

Next, the determination unit 414 calculates a predicted value and a confidence interval by using the probability density function P(x), and the output unit 415 outputs the prediction result 427 including the predicted value and the confidence interval (step 1015).

Next, the distribution generation unit 413 compares t with tP (step 1016). When t is less than tP (NO in step 1016), the distribution generation unit 413 increments t by 1 (step 1019), and the prediction apparatus 401 repeats the processing of step 1004 and subsequent steps.

When t reaches tP (YES in step 1016), the distribution generation unit 413 checks whether all cells have been selected (step 1017). When an unselected cell remains (NO in step 1017), the prediction apparatus 401 repeats the processing of step 1001 and subsequent steps for the next cell. When all cells have been selected (YES in step 1017), the prediction apparatus 401 ends the processing.

Figures 11A, 11B, 11C:
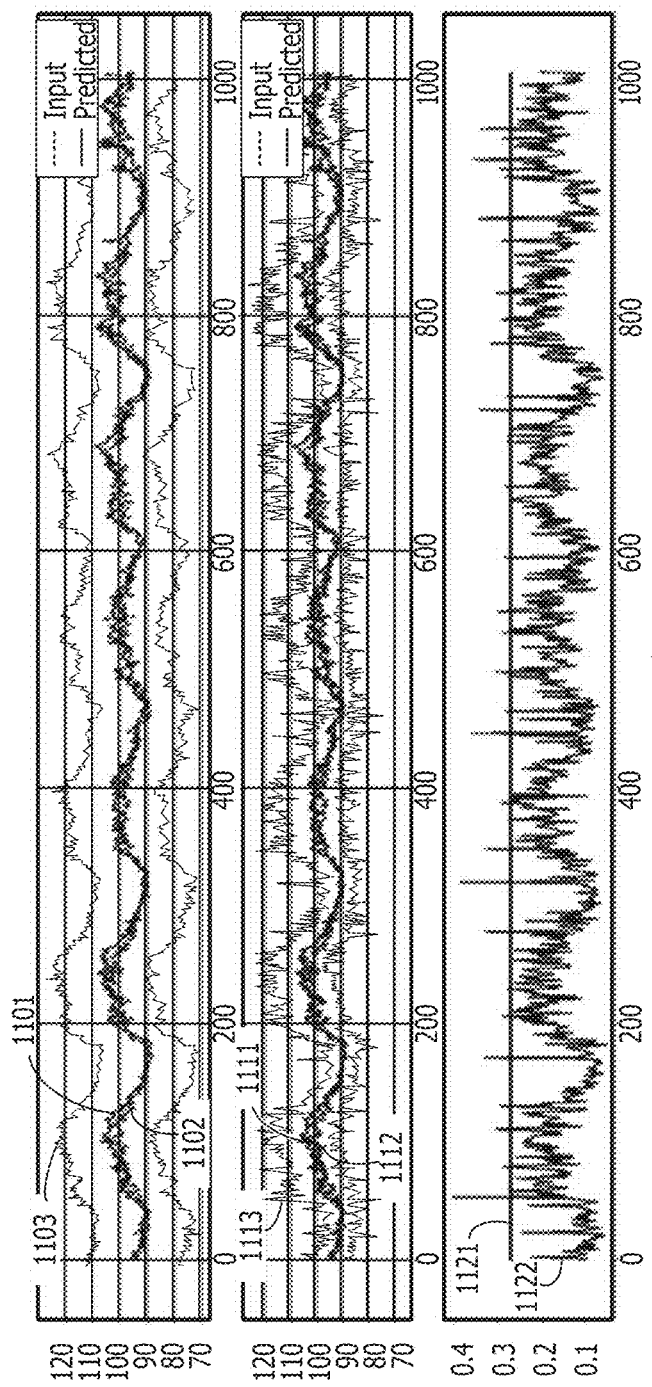
FIGS. 11A to 11C are diagrams illustrating prediction results of communication traffic volume.

FIGS. 11A to 11C illustrate examples of prediction results of communication traffic volume in a wireless communication system. FIG. 11A illustrates an example of a prediction result of prediction processing P1 in which a predicted value is excessively estimated. The horizontal axis represents time step t, and the vertical axis represents communication traffic volume before normalization. In the prediction processing P1, a prediction model generated by the deep reinforcement learning of related art is used.

A curved line 1101 represents a temporal change of the predicted value (Predicted) obtained by the prediction processing P1. A curved line 1102 represents a temporal change of the acquired actual communication traffic volume (Input). Areas 1103 above and below the curved line 1101 represent a temporal change of the margin for the predicted value. In this case, the maximum error of the training data used in the deep reinforcement learning is used as the margin.

FIG. 11B illustrates an example of a prediction result of prediction processing P2 performed by the prediction apparatus 401 in FIG. 4. The horizontal axis represents time step t, and the vertical axis represents communication traffic volume before normalization. As the hyperparameters in the prediction processing P2, the following values are used.

T=12
WA=100
HA=100
D1=3
D2=20
L=2
D3=512
D4=512
K=3
WB=3
HB=3
M=3
Δ=0.15
ε=0.005

A curved line 1111 represents a temporal change of the predicted value (Predicted) obtained by the prediction processing P2. A curved line 1112 represents a temporal change of the acquired actual communication traffic volume (Input). Areas 1113 above and below the curved line 1111 represent a temporal change of the margin for the predicted value. In this case, a 99% confidence interval is used as the margin.

FIG. 11C illustrates an example of a temporal change of the margin after normalization. The horizontal axis represents time step t, and the vertical axis represents margin after normalization. A straight line 1121 represents a temporal change of the margin for the predicted value in the prediction processing P1. The margin for the predicted value in the prediction processing P1 is a fixed value that does not change temporally. A curved line 1122 represents a temporal change of the margin for the predicted value in the prediction processing P2.

Comparing FIG. 11A and FIG. 11B, it may be seen that the proportions of time steps t at which the predicted value is smaller than the actual communication traffic volume are almost the same.

On the other hand, in FIG. 11C, the margin for the predicted value in the prediction processing P2 is smaller than the margin for the predicted value in the prediction processing P1 at most time steps t. Therefore, it may be seen that the prediction error may be reduced by applying the prediction processing P2. The margin for the predicted value in the prediction processing P2 is large in a time period in which prediction is unstable, and is small in a time period in which prediction is stable.

The configuration of the prediction apparatus 201 in FIG. 2 and the configuration of the prediction apparatus 401 in FIG. 4 are merely examples. Some of the constituent elements may be omitted or changed depending on the application or conditions of the prediction apparatus. For example, in a case where the training processing of the prediction apparatus 401 in FIG. 4 is performed by an external apparatus, the training unit 411 may be omitted.

The flowcharts in FIGS. 3 and 9A to 10B are merely examples. Some of the types of processing may be omitted or changed depending on the configuration or conditions of the prediction apparatus. For example, in a case where the training processing of the prediction apparatus 401 in FIG. 4 is performed by an external apparatus, the training processing in FIGS. 9A and 9B may be omitted.

The temporal changes of predicted value and margin illustrated in FIGS. 1 and 11 are merely examples. Temporal changes of predicted value and margin change depending on time-series data and subsequent-stage application. The training data set illustrated in FIG. 5 is merely an example. A training data set changes depending on machine learning model.

The machine learning model illustrated in FIG. 6, the MDN 614 illustrated in FIG. 7, and the prediction model 423 illustrated in FIG. 8 are merely examples. A machine learning model, the MDN 614, and the prediction model 423 having different configurations may be used. The prediction model 423 may be generated by using a machine learning model other than a neural network. Instead of a PB vector, other feature information indicating the feature of time-series data may be used.

Formula (1) to formula (3) are merely examples. The prediction apparatus 401 may perform the training processing and the prediction processing by using other calculation formulas.

Figure 12:
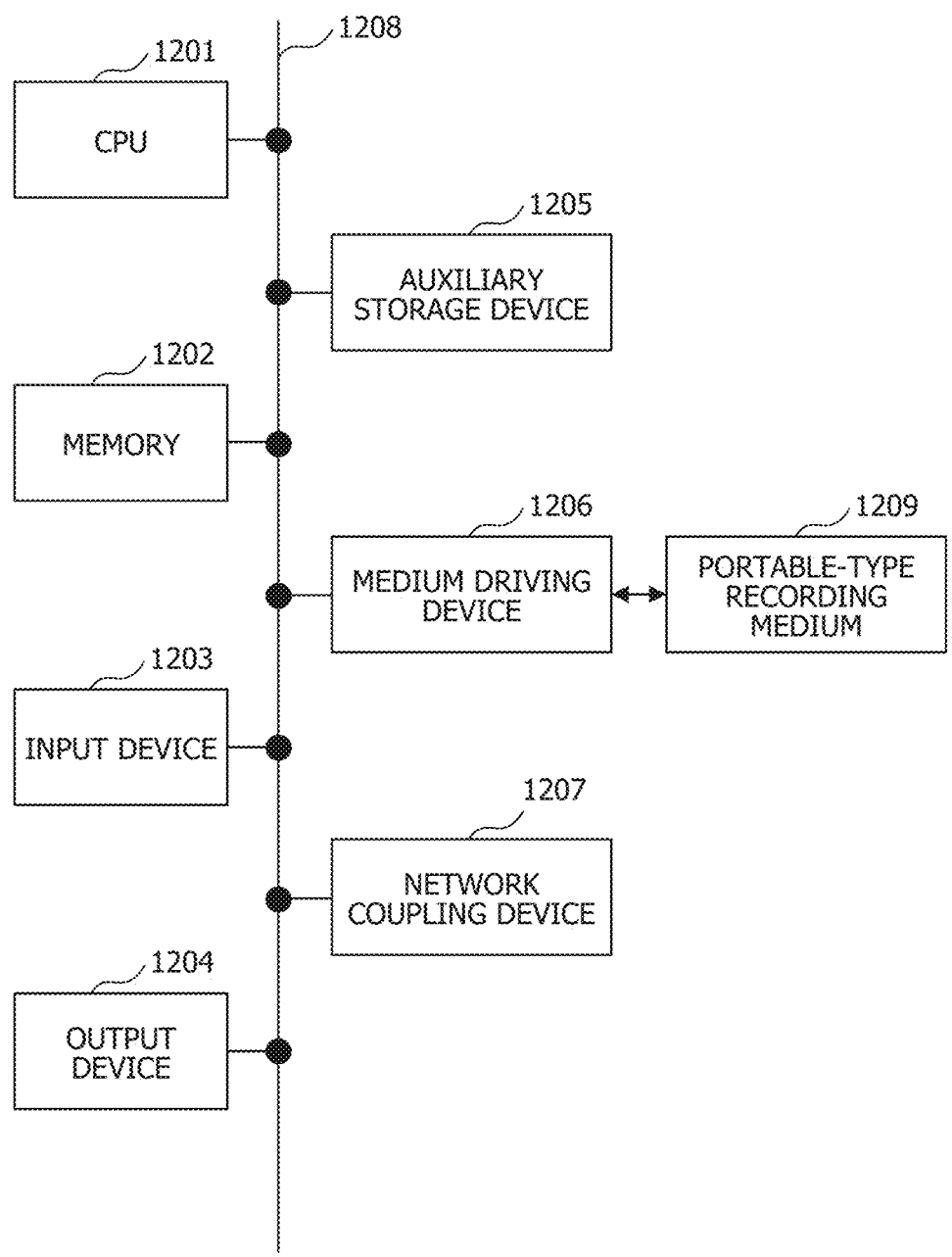
FIG. 12 is a diagram illustrating a hardware configuration of an information processing apparatus.

FIG. 12 illustrates an example of a hardware configuration of an information processing apparatus (computer) used as the prediction apparatus 201 in FIG. 2 and the prediction apparatus 401 in FIG. 4. The information processing apparatus in FIG. 12 includes a central processing unit (CPU) 1201, a memory 1202, an input device 1203, an output device 1204, an auxiliary storage device 1205, a medium driving device 1206, and a network coupling device 1207. These constituent elements are pieces of hardware, and are coupled to each other by a bus 1208.

For example, the memory 1202 is a semiconductor memory such as a read-only memory (ROM) or a random-access memory (RAM), and stores a program and data used for processing. The memory 1202 may operate as the storage unit 416 in FIG. 4.

For example, the CPU 1201 (processor) operates as the identification unit 211, the distribution generation unit 212, and the determination unit 213 in FIG. 2 by executing a program using the memory 1202. The CPU 1201 also operates as the training unit 411, the identification unit 412, the distribution generation unit 413, and the determination unit 414 in FIG. 4 by executing a program using the memory 1202.

For example, the input device 1203 is a keyboard, a pointing device, or the like, and is used to input information or an instruction from a user or operator. For example, the output device 1204 is a display device, a printer or the like, and is used to output a processing result and an inquiry or instruction to a user or operator. A processing result may be the prediction result 427. The output device 1204 may operate as the output unit 415 in FIG. 4.

For example, the auxiliary storage device 1205 is a magnetic disk device, an optical disk device, a magneto-optical disk device, a tape device, or the like. The auxiliary storage device 1205 may be a hard disk drive. The information processing apparatus may store a program and data in the auxiliary storage device 1205, and use the program and data by loading them into the memory 1202. The auxiliary storage device 1205 may operate as the storage unit 416 in FIG. 4.

The medium driving device 1206 drives a portable-type recording medium 1209, and accesses the contents recorded therein. The portable-type recording medium 1209 is a memory device, a flexible disk, an optical disk, a magneto-optical disk, or the like. The portable-type recording medium 1209 may be a compact disk read-only memory (CD-ROM), a Digital Versatile Disk (DVD), a Universal Serial Bus (USB) memory, or the like. A user or operator may store a program and data in the portable-type recording medium 1209, and use the program and data by loading them into the memory 1202.

As described above, a computer-readable recording medium in which a program and data to be used in processing are stored is a physical (non-transitory) recording medium such as the memory 1202, the auxiliary storage device 1205, or the portable-type recording medium 1209.

The network coupling device 1207 is a communication interface circuit that is coupled to a communication network such as a wide area network (WAN) or a local area network (LAN) and performs data conversion associated with communication. The information processing apparatus may receive a program and data from an external apparatus via the network coupling device 1207, and use the program and data by loading them into the memory 1202. The network coupling device 1207 may operate as the output unit 415 in FIG. 4.

The information processing apparatus does not have to include all the constituent elements in FIG. 12. Some of the constituent elements may be omitted or changed depending on the application or conditions of the information processing apparatus. For example, in a case where an interface with a user or operator does not have to be used, the input device 1203 and the output device 1204 may be omitted. In a case where the portable-type recording medium 1209 or a communication network is not used, the medium driving device 1206 or the network coupling device 1207 may be omitted.

Although the disclosed embodiment and its advantages have been described in detail, those skilled in the art would be able to make various changes, additions, and omissions without deviating from the scope of the present disclosure clearly described in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a program for causing a computer to execute a process, the process comprising:
   generating a prediction model by training a machine learning model for predicting data of a processing target cell using a plurality of pieces of time-series data, each of the plurality of pieces of time-series data includes data at each time in a specific time period;
   identifying, among pieces of feature information of a plurality of pieces of time-series data, a plurality of pieces of feature information similar to feature information of processing target time-series data;
   obtaining a predicted value distribution of the processing target time-series data based on each of the plurality of pieces of feature information using the prediction model;
   combining the predicted value distributions of each of the plurality of pieces of feature information using a mixing coefficient to form a combined distribution;
   determining a range of predicted value for the processing target time-series data based on the combined distribution.

2. The non-transitory computer-readable recording medium according to claim 1, the process further comprising:
   identifying the plurality of pieces of feature information by comparing feature information of each of the plurality of pieces of time-series data with feature information of the processing target time-series data, by using feature information of time-series data corresponding to the processing target time-series data among the pieces of feature information of the plurality of pieces of time-series data as the feature information of the processing target time-series data.

3. The non-transitory computer-readable recording medium according to claim 1, wherein
the processing target time-series data includes data at each time in a predetermined time period,
the predicted value distribution of the processing target time-series data represents a distribution of data at a time later than the predetermined time period, and
the process further comprises:
obtaining the predicted value distribution of the processing target time-series data by using time period information indicating the predetermined time period, the processing target time-series data, and each of the plurality of pieces of feature information.

4. The non-transitory computer-readable recording medium according to claim 1, wherein
the pieces of feature information of each of the plurality of pieces of time-series data are parameters determined using the machine learning model.

5. An information processing apparatus, comprising:
a memory; and
a processor coupled to the memory and the processor configured to:
generate a prediction model by training a machine learning model for predicting data of a processing target cell using a plurality of pieces of time-series data, each of the plurality of pieces of time-series data includes data at each time in a specific time period;
identify, among pieces of feature information of a plurality of pieces of time-series data, a plurality of pieces of feature information similar to feature information of processing target time-series data;
obtain a predicted value distribution of the processing target time-series data based on each of the plurality of pieces of feature information using the prediction model;
combine the predicted value distributions of each of the plurality of pieces of feature information using a mixing coefficient to form a combined distribution;
determine a range of predicted value for the processing target time-series data based on the combined distribution.

6. The information processing apparatus according to claim 5, wherein
the processor is further configured to:
identify the plurality of pieces of feature information by comparing feature information of each of the plurality of pieces of time-series data with feature information of the processing target time-series data, by using feature information of time-series data corresponding to the processing target time-series data among the pieces of feature information of the plurality of pieces of time-series data as the feature information of the processing target time-series data.

7. The information processing apparatus according to claim 5, wherein
the processing target time-series data includes data at each time in a predetermined time period,
the predicted value distribution of the processing target time-series data represents a distribution of data at a time later than the predetermined time period, and
the processor is further configured to:
obtain the predicted value distribution of the processing target time-series data by using time period information indicating the predetermined time period, the processing target time-series data, and each of the plurality of pieces of feature information.

8. The information processing apparatus according to claim 5, wherein
the pieces of feature information of each of the plurality of pieces of time-series data are parameters determined using the machine learning model.

9. A prediction method, comprising:
generating a prediction model by training a machine learning model for predicting data of a processing target cell using a plurality of pieces of time-series data, each of the plurality of pieces of time-series data includes data at each time in a specific time period;
identifying by a computer, among pieces of feature information of a plurality of pieces of time-series data, a plurality of pieces of feature information similar to feature information of processing target time-series data;
obtaining a predicted value distribution of the processing target time-series data based on each of the plurality of pieces of feature information using the prediction model;
combining the predicted value distributions of each of the plurality of pieces of feature information using a mixing coefficient to form a combined distribution;
obtaining a combined distribution from the predicted value distribution; and
determining a range of predicted value for the processing target time-series data based on the combined distribution.

10. The prediction method according to claim 9, further comprising:
identifying the plurality of pieces of feature information by comparing feature information of each of the plurality of pieces of time-series data with feature information of the processing target time-series data, by using feature information of time-series data corresponding to the processing target time-series data among the pieces of feature information of the plurality of pieces of time-series data as the feature information of the processing target time-series data.

11. The prediction method according to claim 9, wherein
the processing target time-series data includes data at each time in a predetermined time period,
the predicted value distribution of the processing target time-series data represents a distribution of data at a time later than the predetermined time period, and
the prediction method further comprises:
obtaining the predicted value distribution of the processing target time-series data by using time period information indicating the predetermined time period, the processing target time-series data, and each of the plurality of pieces of feature information.

12. The prediction method according to claim 9, wherein
the pieces of feature information of each of the plurality of pieces of time-series data are parameters determined using the machine learning model.

* * * * *